United States Patent [19]

Moriizumi et al.

[11] Patent Number: 4,638,883
[45] Date of Patent: Jan. 27, 1987

[54] STEERING SYSTEM FOR AUTOMOTIVE VEHICLE

[75] Inventors: Ryoji Moriizumi; Yoichi Suzuki; Kazuhiro Ameda, all of Ageo, Japan

[73] Assignee: Nissan Diesel Co., Ltd., Saitama, Japan

[21] Appl. No.: 748,019

[22] Filed: Jun. 24, 1985

[30] Foreign Application Priority Data

Jun. 29, 1984 [JP] Japan .............................. 59-97998[U]
Sep. 25, 1984 [JP] Japan ............................ 59-143500[U]

[51] Int. Cl.[4] .............................................. B62D 5/08
[52] U.S. Cl. .................... 180/324; 180/140; 180/321
[58] Field of Search ............... 180/140, 321, 322, 323, 180/324, 142, 143

[56] References Cited

U.S. PATENT DOCUMENTS

| | | | |
|---|---|---|---|
| 1,544,775 | 7/1925 | Plocek | 180/321 |
| 3,080,987 | 3/1963 | Jacquemond | 180/324 |
| 3,604,528 | 9/1971 | Williamson | 180/140 |
| 3,750,834 | 8/1973 | Luft | 180/140 |
| 3,814,203 | 6/1974 | Gieszl | 180/140 |
| 4,318,451 | 3/1982 | Liggett | 180/321 |
| 4,406,472 | 9/1983 | Furukawa | 180/140 |
| 4,552,239 | 11/1985 | Kanazawa | 180/140 |

*Primary Examiner*—John J. Love
*Assistant Examiner*—Everett G. Diederiks, Jr.
*Attorney, Agent, or Firm*—Jordan and Hamburg

[57] ABSTRACT

A steering device for an automotive vehicle includes steering wheels one of which is associated with a driver's seat positioned at the front of the vehicle and the other with a seat positioned at the rear of the vehicle and available for manipulating a crane or the like. Power cylinders are provided for hydraulically steering front wheels only or both of front wheels and rear wheels of the vehicle. Hydraulic circuits associated with the power cylinders are controlled such that while the wheels are steered at the driver's seat, they cannot be steered at the craneman's seat. Such control of the hydraulic circuits occurs in response to actuation of a key switch. A four-wheel steering mode for steering the front and rear wheels at the same time is prevened from replacing a two-wheel steering mode for steering front wheels only, unless the vehicle runs at low speeds.

8 Claims, 6 Drawing Figures

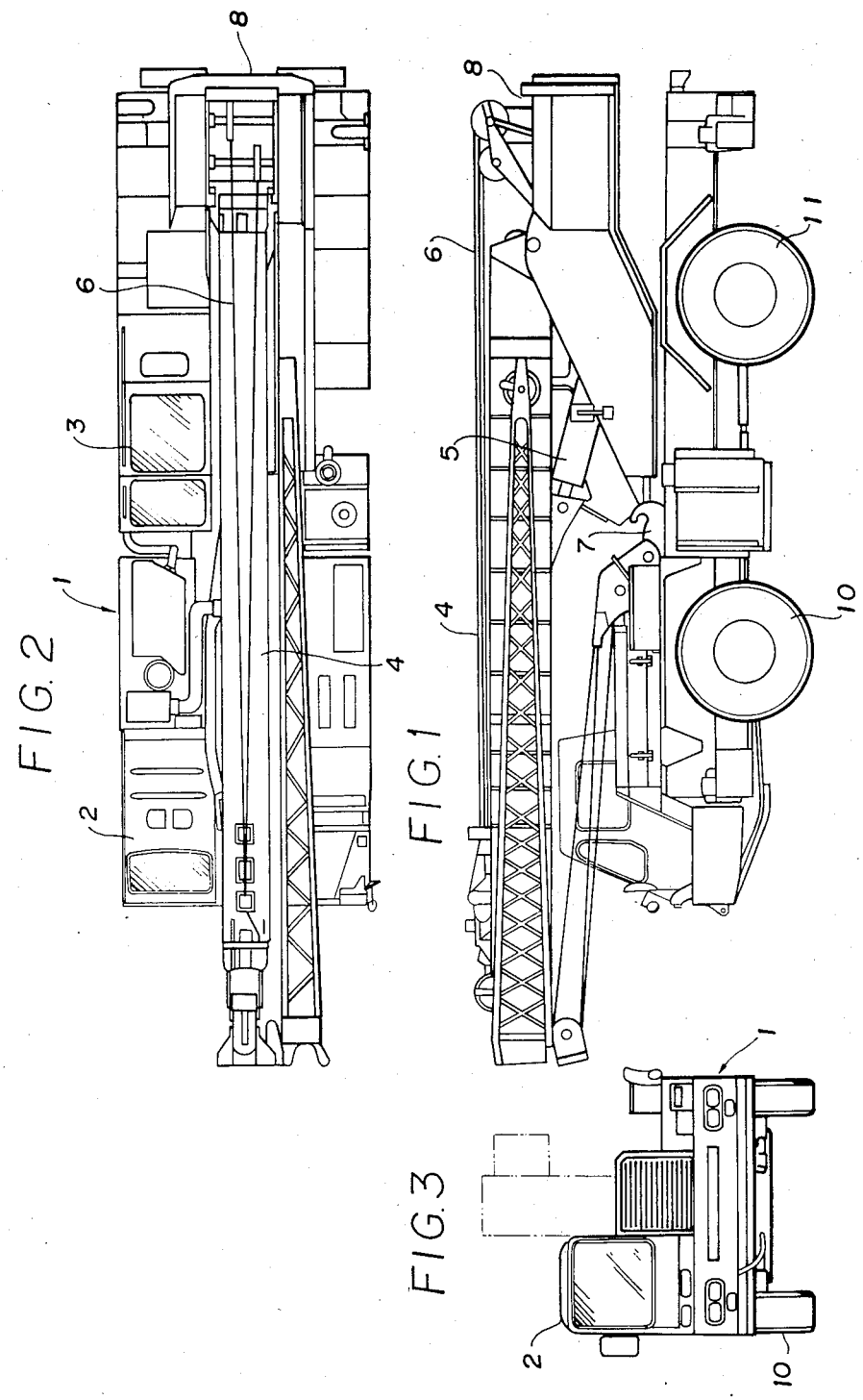

STEERING SYSTEM FOR AUTOMOTIVE VEHICLE

BACKGROUND OF THE INVENTION

The present invention relates to a steering system for an all-terrain crane truck or like automotive vehicle and, more particularly, to an improvement in such a steering system which includes one steering wheel accessible from a seat adapted to drive the vehicle and another steering wheel accessible from a seat located behind the first-mentioned seat and adapted to manipulate a crane or the like, so that one may steer the vehicle at a desired one of the two seats.

Automotive vehicles designed for special industrial applications such as construction and engineering works include an all-terrain crane truck which is provided with a crane on top of its chassis. One may manipulate the crane while moving the truck from one place to another. An all-terrain crane truck is usually equipped with two spaced seats on its chassis, i.e., a seat positioned in a front portion of the chassis for driving the truck on throughfares and other ordinary roads (hereinafter referred to as a driver's seat for convenience), and a seat positioned in a rear portion of the chassis for manipulating the crane (hereinafter referred to as a craneman's seat for convenience). The crane is free to swivel in a horizontal plane while lifting a desired object and, for the convenience of a person who manipulates the crane, the craneman's seat is constructed to rotate together with the crane.

At a construction cite, for example, while one is often required to relocate the crane truck during the course of operation of the crane, it would be awkward for him or her to move from the craneman's seat at the rear to the driver's seat at the front every time the need for relocation of the truck arises. In light of this, it has been proposed to furnish the craneman's seat with the same driving instrumentation as a one associated with the driver's seat, such as a steering wheel, gear shift lever, accelerator pedal and brake pedal, so that one may steer the truck at the rear craneman's seat as well as from the front driver's seat. Another capability of such a special truck is a so-called four-wheel steering mode operation in which not only front wheels but also rear wheels are steered in order to facilitate sharp turns in narrow places at construction cites.

For the structures described above, a reference may be made to Japanese Utility Model Application No. 196480/1982, for example.

Where an automotive vehicle has two steering wheels such as those assigned to the front driver's seat and rear craneman's seat as described to allow the vehicle to be steered at any of the seats, it is desirable that while the vehicle is steered at one of the seats, steering at the other seat is inhibited. The reason is that should the vehicle be steerable at the rear craneman's seat while it is steered at the front driver's seat, its running direction might possibly be changed against the driver's intention to bring about a dangerous situation.

The steering system installed in a vehicle of the kind described comprises a hydraulically operated power steering system. In such a steering system, disabling steering operations at the craneman's seat while the vehicle is steered at the driver's seat may be accomplished by switching hydraulic circuits associated with power cylinders such that the hydraulic pressure communicated to the power cylinders cannot be controlled by manipulation of the steering wheel at the craneman's seat so long as steering at the driver's seat is under way. This hydraulic circuit switching scheme is not fully acceptable, however, because the hydraulic circuits still have a chance of being switched at the craneman's seat while the vehicle is steered at the driver's seat.

As previously stated, the vehicle of the kind concerned may be steered at both the front and rear wheels to reduce the turning radius and, thereby, enhance operationability of the vehicle. The four-wheel steering mode, however, has the drawback that when effected during high-speed running on ordinary roads it might accidentally cause the vehicle to make a sharp turn resulting in an unstable position of the vehicle body and, therefore, unstable steering. It is desirable, therefore, that a four-wheel steering mode be enabled only at low vehicle speeds with a two-wheel steering mode as distinguished from the four-wheel mode set up at high vehicle speeds.

SUMMARY OF THE INVENTION

It is therefore an object of the present invention to provide a steering system for an automotive vehicle which prevents steering from being switched at one of driver's and craneman's seats while a steering operation is under way at the other, thereby enhancing safety operation of the vehicle.

It is another object of the present invention provide a steering system for an automotive vehicle which allows a two-wheel steering mode to be replaced by a four-wheel steering mode at low vehicle speeds only.

It is another object of the present invention to provide a generally improved steering system for an automotive vehicle.

A steering system of the present invention is of the type hydraulically steering front wheels only or both of front wheels and rear wheels of an automotive vehicle responsive to manipulation of any of steering wheels which respectively are accessible from a first seat positioned in a front portion of the vehicle and a second seat positioned in a rear portion of the vehicle, the first seat being adapted to drive the vehicle and the second seat to manipulate a crane or the like which is mounted on the vehicle. The steering system comprises power cylinders for changing orientation of the front wheels and power cylinders for changing orientation of the rear wheels, directional control valves associated respectively with the first seat and the second seat for selectively communicating hydraulic fluid under pressure from a source to the power cylinders each responsive to a direction of rotation of the steering wheel associated with the directional control valve, a first solenoid-operated valve for selectively distributing the fluid under pressure from the source to the directional control valves, second and third solenoid-operated valves included in a hydraulic circuit between the directional control valves and the power cylinders for selectively connecting the directional control valves and the power cylinders, a power source circuit for applying a switching current to the first to third solenoid-operated valves via a key switch which is associated with the first seat, a power source circuit for applying a switching current to the first to third solenoid-operated valves via a key switch which is associated with the second seat, a relay for cutting off the power source circuit associated with the second seat when the key switch associated with the first seat is turned on, a relay for cutting off the power source circuit associated with the first seat when the key switch associated with the second seat is turned on, and a solenoid-operated directional control valve for selectively establishing and interrupting a hydraulic circuit between the power cylinders associated with the front wheels and the power cylinders associated with the rear wheels.

In accordance with the present invention, a steering device for an automotive vehicle includes steering wheels one of which is associated with a driver's seat positioned at the front of the vehicle and the other with a seat positioned at the rear of the vehicle and available for manipulating a crane or the like. Power cylinders are provided for hydraulically steering front wheels only or both of front wheels and rear wheels of the vehicle. Hydraulic circuits associated with the power cylinders are controlled such that while the wheels are steered at the driver's seat, they cannot be steered at the craneman's seat. Such control of the hydraulic circuits occurs in response to actuation of a key switch. A four-wheel steering mode for steering the front and rear wheels at the same time is prevented from replacing a two-wheel steering mode for steering front wheels only, unless the vehicle runs at low speeds.

The above and other objects, features and advantages of the present invention will become more apparent from the following detailed description taken with the accompanying drawings.

BRIEF DESCRIPTION OF THE DRAWINGS

FIG. 1 is a side elevation of an automotive vehicle to which a steering system embodying the present invention is applied;

FIG. 2 is a plan view of the vehicle shown in FIG. 1;

FIG. 3 is a fragmentary front view of the vehicle shown in FIG. 1;

DESCRIPTION OF THE PREFERRED EMBODIMENT

Figure 4:
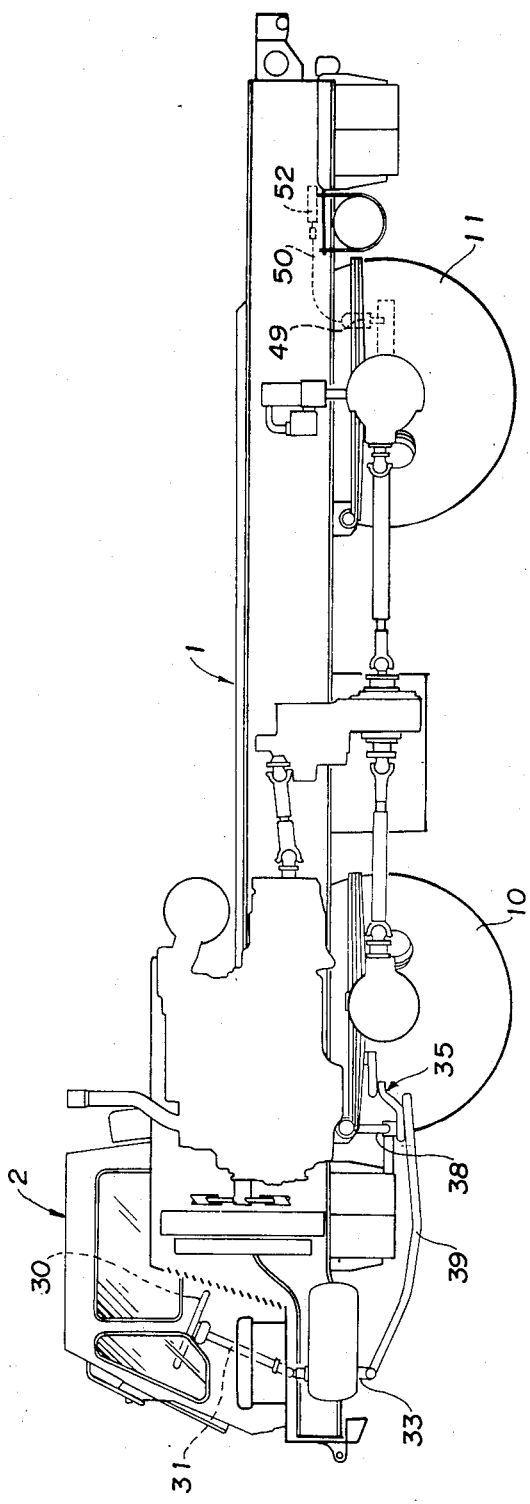
FIG. 4 is a side elevation of a chassis of the vehicle shown in FIG. 1.

While the steering system for an automotive vehicle of the present invention is susceptible of numerous physical embodiments, depending upon the environment and requirements of use, a substantial number of the herein shown and described embodiment have been made, tested and used, and all have performed in an eminently satisfactory manner.

Referring to FIGS. 1-3 of the drawings, an automotive vehicle, or an all-terrain crane truck in this particular embodiment, to which the present invention is applied comprises a vehicle body generally designated by the reference numeral 1. A driver's seat 2 is located at the front of the vehicle body 1 and a craneman's seat 3 at the rear of the same. A crane 4 is mounted on the vehicle body 1 to swivel in a horizontal plane. The craneman's seat 3 is movable integrally with the crane 4. The crane 4 is raised and lowered by a hydraulic cylinder 5. A winch 8 is adapted to take up a wire 6 from the front end of which a hook 7 is suspended. The vehicle body 1 is supported by a pair of front wheels 10 and a pair of rear wheels 11 all of which may be steered from either the driver's seat 2 or the craneman's seat 3.

Figure 5:
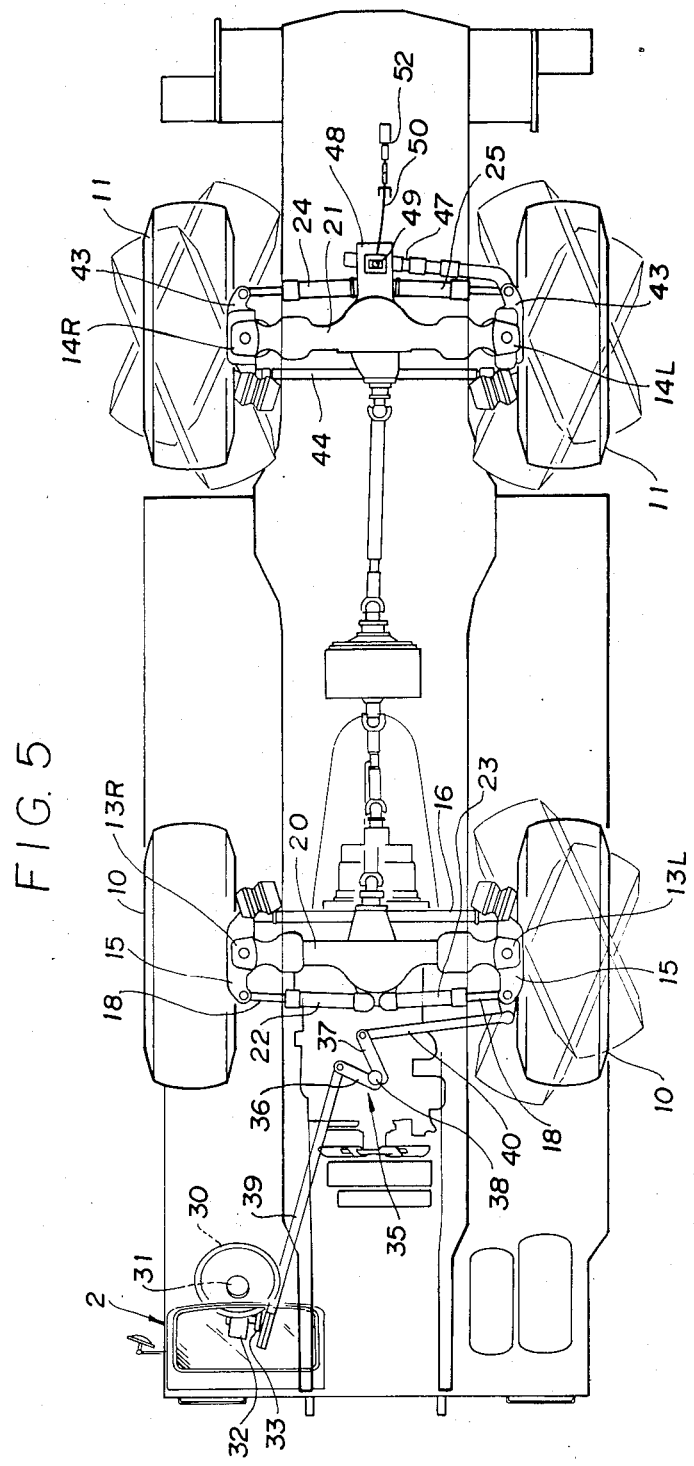
FIG. 5 is a plan view of the chassis shown in FIG. 4.

As shown in FIGS. 4 and 5, the front wheels 10 are supported by a front axle 20 and the rear wheels 11 by a rear axle 21. Specifically, the right and left front wheels 10 are rotatably fulcrumed by knuckles 13R and 13L, respectively, and the right and left rear wheels 11 by knuckles 14R and 14L, respectively. Power cylinders 22 and 23 respectively are provided to allow the front wheels 10 to move about their associated knuckles 13R and 13L, while power cylinders 24 and 25 respectively are provided to allow the rear wheels 11 to move about their associated knuckles 14R and 14L.

An arm 15 integral with the right knuckles 13R and another arm 15 integral with the left knuckle 13L extend each in the longitudinal direction of the vehicle body 1. A tie-rod 16 extends to opposite sides of the front axle 20 to connect the rear ends of the right and left arms 15 to each other. The front axle 20 and the tie-rod 16 are equal in effective length and so are the right and left arms 15, so that the arms 15, front axle 20 and tie-rod 16 complete a parallelogram linkage. This equalizes the steering angles of inner and outer wheels with respect to a steering angle and, thereby, the effective strokes of the power cylinders 22 and 23. Especially, concerning a fully hydraulic power steering mechanism associated with the craneman's seat 3, a steering wheel will regain its initial condition when returned to a neutral position from any angular steering position, preventing one from feeling the steering sense strange and, yet, accommodating a substantial steering angle. Where the steering angle is designed to differ from the inner wheel to the outer wheel, the resulting difference in stroke between the right and left power cylinders would cause the amount of rotation of the steering wheel to change during reciprocation, preventing the steering wheel from restoring its initial position when returned to a neutral position.

Piston rods 18 extend out from the power cylinders 22 and 23 and respectively are connected to the front ends of the arms 15. Arranged substantially parallel to the front axle 20, the power cylinders 22 and 23 are each connected at the base end to a differential gear casing (no numeral), which is located at the intermediate between opposite ends of the front axle 20. As will be described, the power cylinders 22 and 23 are selectively supplied with a hydraulic fluid pressure responsive to manipulation of a steering wheel so as to be expanded and compressed, whereby the front wheels 10 are moved about their associated knuckles 13R and 13L.

A steering wheel 30 adjacent to the driver's seat 2 is connected to a steering shaft 31 which in turn is connected to a steering gear 32. A pitman arm 33 is operatively connected to the steering gear 32. An idler arm 35 has a generally bellcrank configuration made up of two arms 36 and 37 and is mounted to a part of the vehicle body 1 by a bracket 38 to swivel in a horizontal plane. Specifically, the idler arm 35 is supported by the bracket 38 in the vicinity of the front axle 20 and substantially at the intermediate between the laterally opposite ends of the vehicle body 1. The first arm 36 is connected to a tip of the pitman arm 33 by a first drag link 39, while the second arm 37 is connected by a second drag link 40 to a tip of the arm 15 which is associated with the knuckle 13L. Extending substantially parallel to the front axle 20, the second drag link 40 is driven in a motion along the axis of the front axle 20 through the idler arm 35 responsive to a motion of the first drag link 39 which occurs in the longitudinal direction of the vehicle body 1. Such a motion of the drag link 40 causes the arm 15 to move about the knuckle 13L. Since the knuckle 13L is connected to the knuckle 13R by the tie-rod 16, any angular movement of one of the arms 15 is accompanied by the same angular movement of the other arm 15 so that the right and left front wheels 10 are steered over the same angle.

As previously stated, the idler arm 35 to which the first drag link 39 is connected is located substantially at the intermediate between the laterally opposite ends of the vehicle body 1. The drag link 39, therefore, does not interfere with any of the front wheels 10 and allows the maximum steering angle of the front wheels 10 to be designed significantly large in either direction.

In the case where the roll center resulting from rolling of the vehicle body 1 is located above the point of connection between the second drag link 40 and the idler arm 35, rolling would change the distance from the point of connection to the knuckle 13L and the distance from the roll center to the knuckle 13L to exert a compressive or expansive force on the second drag link 40, which would then move the arms 15 and, thereby, the front wheels 10. In such a case, it is desirable to employ a stabilizer so that the roll center substantially aligns with the point of connection between the drag link 40 and the idler arm 35.

Arms 43, like the arms 15, extend from the knuckles 14R and 14L which respectively are associated with the right and left rear wheels 11. The arms 43 are connected to each other by a tie-rod 44 at the front side of the rear axle 21. Piston rods 45 extending out from the power cylinders 24 and 25 are connected to the tips of the arms 43, respectively. When hydraulic fluid under pressure is fed to the power cylinders 24 and 25, the rear wheels 11 are steered in synchronism as will be described later in detail. The base ends of the power cylinders 24 and 25 are each connected to a differential gear casing of the rear axle 21.

Both the front wheels 10 and rear wheels 11 are steerable at the same time in a four-wheel steering mode and only the front wheels 10 in a two-wheel steering mode. In the two-wheel steering mode, the rear wheels 11 are made unsteerable by a steering lock mechanism as will be described.

Figure 6:
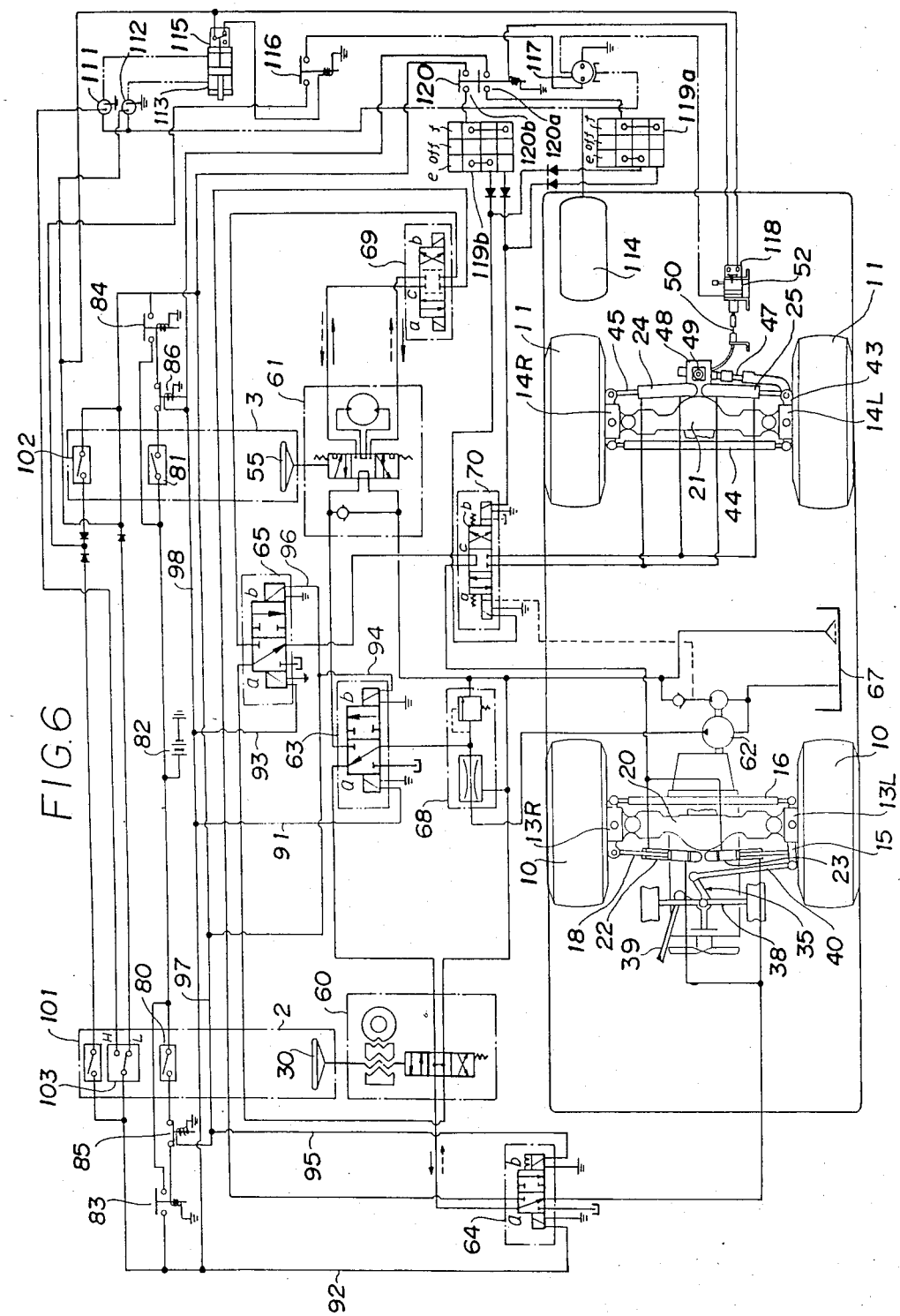
FIG. 6 shows the steering system together with hydraulic circuits in accordance with the present invention.

As best shown in FIG. 6, the steering lock mechanism comprises a slide rod 47 which is connected at one end to the arm 43 which is associated with the left rear wheel 11. The slide rod 47 slidably extends through a bracket 48 which is mounted on the rear axle 21. A lock pin 49 is provided on the bracket 48 such that in a two-wheel steering mode it protrudes perpendicularly into a hole provided in the slide rod 47 so as to lock the slide rod 47 in position. The lock pin 49 is connected to a lock cylinder 52 by a wire 50. As a pressure chamber of the lock cylinder 52 is communicated to a source of pressurized air supply (not shown), the cylinder 52 pulls the lock pin 49 out of the slide rod 47 to allow the latter to freely move. Conversely, when it is communicated to the atmosphere, a return spring (not shown) causes the lock pin 49 to thrust into the hole of the slide rod 47 to thereby lock the slide rod 47 in position. As described later in detail, the lock cylinder 52 is operable only at low vehicle speeds so as to unlock the rear wheels 11.

The lock cylinder 52 as well as a limit switch (not shown) adapted to sense the strokes of the cylinder 52 are mounted on a part of the vehicle body above the rear axle 21 so that they may be safeguarded against pebbles and others, which are apt to jump from the road surface while the vehicle is driven.

A control circuit for controlling the power cylinders 22-25 and lock cylinder 52 will be described with reference to FIG. 6. As shown, the control circuit includes a directional control valve, or selector, 60 which is responsive to the rotation of the steering wheel 30 at the driver's seat 2, and a selector 61 responsive to the rotation of a steering wheel 55 at the craneman's seat 3. When the steering wheel 30 or 55 is manipulated to actuate the associated selector 60 or 61, hydraulic fluid is selectively fed under pressure from a pump 62 to the power cylinders 22-25 depending upon the direction of rotation of the steering wheel; during a two-wheel steering mode, the front wheels 10 are steered and, during a four-wheel steering mode, both the front wheels 10 and the rear wheels 11 are steered.

Solenoid-operated control valves 63, 64 and 65 are actuated by a key switch 80 associated with the driver's seat 2 or a key switch 81 associated with the craneman's seat 3 such that, while the steering wheel 30 is operated, the fluid under pressure from the pump 62 is communicated to the power cylinders 22-25 only through the selector 60 and, while the steering wheel 55 is operated, the communication of the pressurized fluid is controlled by way of the selector 61 only. Specifically, the first control valve 63 functions to selectively communicate the fluid from the pump 62 to the selector 60 or 61 through a flow control orifice 68. The second control valve 64 is interposed between the selector 60 and the power cylinders, while the third control valve 65 is interposed between the selector 61 and the power cylinders.

Changeover relays 83 and 84 respectively are connected to the key switches 80 and 81 in order to actuate the control valves 63-65 in the event of steering. The changeover relays 83 and 84 each comprises a normally open relay which closes its contacts upon turnon of its associated key switch 80 or 81. As the relay 83 is energized, a current from a power source, or battery, 82 flows through lines 91, 92 and 93 to solenoids which are positioned at the left-hand side of the respective control valves 63-65, thereby energizing those solenoids to switch the control valves 63-65 each to an operative position a. In this condition, the vehicle can be steered at the driver's seat 2 only and the fluid from the pump 62 is delivered to the power cylinders 22-25 through the selector 60. On the other hand, when the relay 84 is energized, solenoids at the right-hand side of the control valves 63-65 are energized via lines 94, 95 and 96 to actuate the control valves 63-65 each to the other operative position b, whereby the fluid from the pump 62 is communicated to the power cylinders 22-25 through the selector 61. This enables one to steer the vehicle at the craneman's seat 3 only.

A normally closed cutoff relay 85 is connected between the key switch 80 and the changeover relay 83, and a normally closed cutoff relay 86 between the key switch 81 and the changeover relay 84. The cutoff relays 85 and 86 are adapted to deenergize one of the changeover relays 83 and 84 when the other is energized. Specifically, when the relay 84 associated with the craneman's seat 3 is energized, the relay 85 associated with the driver's seat 2 has its coil energized via a line 97 to open its contact. Meanwhile, when the relay 83 associated with the driver's seat 2 is energized, the relay 86 associated with the craneman's seat 3 has its coil energized via a line 98 to open its contact.

In the above construction, when the key switch 80 at the driver's seat 2 is turned on, the changeover relay 83 is energized to close its contact and the cutoff relay 86 associated with the craneman's seat 3 is energized to open its contact. Therefore, so long as the key switch 80 at the driver's seat 2 is turned on, the relay 84 cannot be energized even if the key switch 81 at the craneman's seat 3 is turned on, that is, the vehicle can be steered at the driver's seat 2 only. Likewise, when the key switch 81 at the manipulator's seat 3 is turned on, the changeover relay 84 is energized to close the contact, while the cutoff relay 85 opens the contact. In such a condition, the changeover relay 83 cannot be activated even if the key switch 80 at the driver's seat 2 is turned on, enabling the vehicle to be steered at the craneman's seat 3 only.

As seen from the above, when the key switch 80 at the driver's seat 2 is turned on to steer the vehicle, the contact of the changeover relay 83 is turned on via the normally closed cutoff relay 85 so that the left solenoids of the control valves 63-65 respectively are energized via the lines 91-93 to switch their associated control valves 63-65 to operative positions a. As a result, the fluid under pressure from the pump 62 is communicated to the selector 60 by way of the control valve 63 and, depending upon the resulting position of the selector 60 which is responsive to the rotation of the steering wheel 30, the fluid is passed through the control valve 64 or 65 to the power cylinders 22-25. The fluid coming out of the power cylinders is returned to a reservoir 67 by way of the control valve 64 or 65. Under this condition, even if the steering wheel 55 at the craneman's seat 3 is operated to actuate the selector 61, the vehicle cannot be steered thereat because the control valve 63 intercepts the flow of the pressurized fluid toward the selector 61 and, in addition, the control valves 64 and 65 interrupt the communication between the selector 61 and the power cylinders 22-25. It will readily be imagined that when the key switch 81 associated with the craneman's seat 3 is turned on to steer the vehicle, steering at the driver's seat 1 is disabled due to the opposite situation to the above-described.

Now, since the craneman's seat 3 swivels in a horizontal plane together with the crane during the course of operation of the latter, it may face sometimes forward and sometimes rearward with respect to the longitudinal direction of the vehicle. When one seated in the craneman's seat 3 which is directed to face rearward, for example, intends to drive the vehicle ahead, or backward in ordinary sense, he or she is apt to suffer from uneasy sensations due to the reversal of steering senses. In light of this, the control circuit shown in FIG. 6 is equipped with a solenoid-operated selector 69 which is interposed between the selector 61 and the second control valve 64 or third control valve 65. Specifically, the forward and backward orientations of the craneman's seat 3 in the event of steering which is effected at the seat 3 are sensed to switch the position of the selector 69 either automatically or by means of a manual switch, so that one may be freed from the inversion of steering senses. Comparing a case wherein the selector 69 is in a first operative position a and a case wherein it is in a second operative position b, the flow of the hydraulic fluid to the second and third valves 64 and 65 is reversed upon actuation of the selector 61 which occurs in response to a steering operation. The reversal of the fluid flow in turn reverses the expanding and compressing motions of the power cylinders 22-25 and, thereby, the wheel steering directions. Such a construction makes is possible for one to steer the vehicle without being puzzled even when the orientations of the craneman's seat 3 is inverted.

Hereinafter will be described a construction and arrangement for selecting a two-wheel steering mode wherein only the front wheels are steerable or a four-wheel steering mode wherein the rear wheels are steerable simultaneously with the front wheels.

As shown in FIG. 6, a solenoid-operated, selector 70 adapted for two-wheel/four-wheel selection is installed between the power cylinders 22 and 23 associated with the front wheels 10 and the power cylinders 24 and 25 associated with the rear wheels 11. The selector 70 has a first operative position a which hydraulically connects the front power cylinders 22 and 23 and the rear power cylinders in parallel, a second operative position which hydraulically connects them crosswise, and a neutral position c which interrupts the supply of the hydraulic fluid to the rear power cylinders 24 and 25. When the front and rear power cylinders are connected in parallel, the front wheels 10 and the rear wheels 11 will be steered in the same direction; when the former are connected crosswise, the latter will be steered in opposite directions. Steering the front and rear wheels in the same direction will allow the vehicle to readily change the lane or be moved aside, while steering them in opposite directions will desirably reduce the turning radius of the vehicle to facilitate small sharp turns.

To controllably switch the steering mode from two-wheel to four-wheel, an unlock or four-wheel selector switch 101 is associated with the driver's seat 2 and an unlock switch 101 with the craneman's seat 3. In order that a four-wheel steering mode may be set up, it is necessary to actuate the lock cylinder 52 to thereby cancel the steering lock, that is, to pull the lock pin 49 out of the slide rod 47 so as to unlock the power cylinders 24 and 25 and, then, actuate the two-wheel/four-wheel selector 70 from the neutral position c to the operative position a or b.

In the above condition, the switch of the steering mode from two-wheel to four-wheel should preferably be allowed only during low-speed operations of the vehicle in order to ensure safetiness.

A high-speed/low-speed changeover switch 103 is located adjacent to the driver's seat 2 in order to control the gear shift position of a power tranmission of the vehicle to low speed or to a high speed. An air valve 111 is opened when a high-speed contact of the switch 103 is on, while an air valve 112 is opened when a low-speed contact of the switch 103 is on. These air valves 111 and 112 are adpated to reversibly control compressed air which is communicated from an air reservoir 114 to a shift air cylinder 113, so that the air cylinder 114 may shift the power transmission to a low speed or to a high speed.

A low-speed sense switch 115 is actuated interlocked with the movement of the shift cylinder 113 which switches the power transmission from a high speed to a low speed. A low-speed sense relay 116 closes is contact when the switch 115 is turned on. An air valve 117 opens when the normally open relay 116 is turned on. The air valve 117 serves to supply compressed air to the previously mentioned lock cylinder 52. An unlock sense switch 118 is provided which turns on when the lock cylinder 52 is actuated by the compressed air to pull out the lock pin 49. Connected in series with the switch 118 is a relay 120 having contacts 120a and 120b. Select switches 119a and 119b are connected to the relay contacts 120a and 120b, respectively. The relay contact 120a is connected to the relay 83 and the relay contact to the relay 84, so that a current is applied to the contact 120a when steering is effected at the seat 2 and to the contact when it is effected at the seat 3. When the unlock sense switch 118 is turned on, both the relay contacts 120a and 120b are turned on. Under this condition, the select switch 119a or 119b is manipulated to control the two-wheel/four-wheel selector 70 to a desired operative position.

The select switches 119a and 119b, which respectively are associated with the seats 2 and 3, are connected to each other by a parallel circuit and each is provided with a pair of contacts e and f which will respectively be selected to steer the front and rear wheels in the same direction and steer them in opposite directions. When the select switch 119a and 119b is connected to the contact e, a solenoid provided at the right-hand side of the selector 70 is energized to actuate the selector 70 to the operative position a, which sets up parallel connection between the power cylinders 22 and 23 associated with the front wheels 10 and the power cylinders 24 and 25 associated with the rear wheels 11. When the select switch 119a or 119b is connected to the contact f, a solenoid at the right-hand side of the selector 70 is energized to actuate the selector 70 to the operative position b, which provides crosswise connection between the rear power cylinders 24 and 25 and the front power cylinders 22 and 23. Further, when the both the contacts e and f are off, none of the solenoids associated with the selector 70 is energized so that the selector 70 remains in the neutral position to isolate the rear power cylinders from the hydraulic circuit.

Assume that one who is seated on the driver's seat 2 has turned on the switch 101 with the intention of switching the steering mode from two-wheel to four-wheel. Then, if the switch 103 is in a low-speed position, the associated relay 116 is turned on to drive the air valve 117 with the result that the lock cylinder 52 is actuated to cancel the steering lock, that is, unlock the power cylinders 24 and 25. This switches the position of the two-wheel/four-wheel selector 70 to communicate fluid under pressure to both the front power cylinders 22 and 23 and the rear power cylinders 24 and 25, thereby allowing the rear wheels 11 to be steered simultaneously with the front wheels 10.

Meanwhile, if the switch 103 is in a high-speed position, the associated switch 115 remains turned off. In this condition, the relay 116 maintains its contact open so that the air valve 117 is not energized to prevent the lock cylinder 52 from cancelling the steering lock. While the steering lock is not cancelled, the unlock sense switch 118 remains turned off to maintain the contacts 120a and 120b of the relay 120 also turned off. Hence, even if the select switch 119a or 119b is connected to the contact a or b from the off-contact, the selector 70 is not energized and, therefore, remains in the position c, interrupting the supply of fluid under pressure to the rear power cylinders 24 and 25. In short, the changeover of the steering mode from two-wheel to four-wheel is enabled only when the power transmission of the vehicle is in a low-speed position and, yet, only after the lock cylinder 52 has unlocked the rear wheels 11.

Each of the select switches 119a and 119b is selectively connectable to the contacts e and f so as to cause the front wheels 10 and the rear wheels 11 to be steered in the same direction and in opposite directions as desired. The selection will be suitably made depending upon the operating conditions of the vehicle.

During the two-wheel steering mode operation, the lock pin 49 restricts the slide rod 47 which extends from the arm 43 of the knuckle 14L associated with the rear wheel 11. Such maintains the rear wheels 11 in a fixed orientation, ensuring stable operations of the vehicle.

Various modifications will become for those skilled in the art after receiving the teachings of the present disclosure without departing from the scope thereof.

What is claimed is:

1. A steering system for hydraulically steering the front wheels only or both of the front wheels and rear wheels of an automotive vehicle responsive to manipulation of any one of a plurality of steering wheels which respectively are accessible from a first seat positioned in a front portion of the vehicle and a second seat positioned in a rear portion of the vehicle, the first seat being adapted to drive the vehicle and the second seat to manipulate a crane or the like which is mounted on the vehicle, said steering system comprising:
   power cylinders for changing orientation of the front wheels and power cylinders for changing orientation of the rear wheels;
   directional control valves associated respectively with the first seat and the second seat for selectively communicating hydraulic fluid under pressure from a source of power to said power cylinders each responsive to the direction of rotation of the steering wheel associated with the directional control valves;
   a first solenoid-operated valve for selectively distributing the fluid under pressure from the source to said directional control valves;
   second and third solenoid-operated valves included in a hydraulic circuit between the directional control valves and the power cylinders for selectively connecting the directional control valves and the power cylinders;
   a power source circuit for applying a switching current to said first to third solenoid-operated valves via a key switch which is associated with the first seat;
   a power source circuit for applying a switching current to the first to third solenoid-operated control valves via a key switch which is associated with the second seat;
   a relay for cutting off said power source circuit associated with the second seat when the key switch associated with the first seat is turned on;
   a relay for cutting off said power source circuit associated with the first seat when the key switch associated with the second seat is turned on; and
   a solenoid-operated directional control valve;
   hydraulic circuit means connecting said power cylinders, said directional control valves, said first, second, and third solenoid-operated valves and said solenoid-operated directional control valve;
   said solenoid-operated directional control valve selectively establishing and interrupting said hydraulic circuit means between the power cylinders associated with the front wheels and the power cylinders associated with the rear wheels.

2. A steering system as claimed in claim 1, wherein each of the first to third control valves is selectively controlled to an operative position for completing a hydraulic circuit which includes the directional control valve associated with the first seat, and an operative position for completing a hydraulic circuit which includes the directional control valve associated with the second seat.

3. A steering device as claimed in claim 1 wherein said solenoid-operated directional control valve has a first position operable to connect the power cylinder of said front wheels in parallel with the power cylinder of said rear wheels such that the front and rear wheels are steered in the same direction, a second position operable to connect the power cylinders of said front wheels crosswise with the power cylinder of said rear wheels such that the front and rear wheels are steered in opposite directions, and a third position which is operable to interrupt the supply of hydraulic fluid to the power cylinders of said rear wheels such that only the front wheels are steered.

4. A steering device as claimed in claim 3 further comprising selector switch means at said first seat and at said second seat operable to select either one of said first, second, or third positions of said solenoid-operated directional control valve.

5. A steering system as claimed in claim 1 wherein said first solenoid-operated valve is operable to selectively communicate the hydraulic fluid from said source of power to either said directional control valve associated with the first seat or the directional control valve associated with the second seat, said second solenoid-operated valve being disposed in the hydraulic circuit means between said directional control valve associated with said first seat and said power cylinders for changing orientation of said front and rear wheels, said third solenoid-operated valve being disposed in the hydraulic circuit means between said directional control valve associated with said second seat and said power cylinders for changing orientation of said front and rear wheels.

6. A steering device as claimed in claim 1 wherein said solenoid-operated directional control valve is operable in one position to steer the rear wheels in one direction corresponding to the direction that the front wheels are steered such that the vehicle will move to the side, and said solenoid-operated directional control valve is operable in another position to steer the rear wheels in an opposite direction than that at which the front wheels are steered such that the vehicle is able to make sharp turns.

7. A steering system for hydraulically steering the front wheels only or both of the front wheels and rear wheels of an automotive vehicle responsive to manipulation of any one of a plurality of steering wheels which respectively are accessible from a first seat positioned in a front portion of the vehicle and a second seat positioned in a rear portion of the vehicle, the first seat being adapted to drive the vehicle and the second seat to manipulate a crane or the like which is mounted on the vehicle, said steering system comprising:

power cylinders for changing orientation of the front wheels and power cylinders for changing orientation of the rear wheels;

directional control valves associated respectively with the first seat and the second seat for selectively communicating hydraulic fluid under pressure from a source of power to said power cylinders each responsive to the direction of rotation of the steering wheel associated with the directional control valve;

a first solenoid-operated valve for selectively distributing the fluid under pressure from the source to said directional control valves;

second and third solenoid-operated valves included in a hydraulic circuit between the directional control valves and the power cylinders for selectively connecting the directional control valves and the power cylinders;

a power source circuit for applying a switching current to said first to third solenoid-operated valves via a key switch which is associated with the first seat;

a power source circuit for applying a switching current to the first to third solenoid-operated control valves via a key switch which is associated with the second seat;

a relay for cutting off said power source circuit associated with the second seat when the key switch associated with the first seat is turned on;

a relay for cutting off said power source circuit associated with the first seat when the key switch associated with the second seat is turned on;

a solenoid-operated directional control valve;

hydraulic circuit means connecting said power cylinders, said directional control valves, said first, second and third solenoid-operated valves and said solenoid-operated directional control valve;

said solenoid-operated directional control valve selectively establishing and interrupting said hydraulic circuit means between the power cylinders associated with the front wheels and the power cylinders associated with the rear wheels, and a steering lock means operable to lock said rear wheels when the power transmission of the automotive vehicle is in a high-speed position to thereby preclude steering the autmotive vehicle via the rear wheels during operation at said high speed position.

8. A steering system for hydraulically steering the front wheels only or both of the front wheels and rear wheels of an automotive vehicle responsive to manipulation of any one a plurality of steering wheels which respectively are accessible from a first seat positioned in a front portion of the vehicle and a second seat positioned in a rear portion of the vehicle, the first seat being adapted to drive the vehicle and the second seat to manipulate a crane or the like which is mounted on the vehicle, said steering system comprising:

power cylinders for changing orientation of the front wheels and power cylinders for changing orientation of the rear wheels;

directional control valves associated respectively with the first seat and the second seat for selectively communicating hydraulic fluid under pressure from a source of power to said power cylinders each responsive to the direction of rotation of the steering wheel associated with the directional control valve;

a first solenoid-operated valve for selectively distributing the fluid under pressure from the source to said directional control valves;

second and third solenoid-operated valves included in a hydraulic circuit between the directional control valves and the power cylinders for selectively connecting the directional control valves and the power cylinders;

a power source circuit for applying a switching current to said first to third solenoid-operated valves via a key switch which is associated with the first seat;
a power source circuit for applying a switching current to the first to third solenoid-operated control valves via a key switch which is associated with the second seat;
a relay for cutting off said power source circuit associated with the second seat when the key switch associated with the first seat is turned on;
a relay for cutting off said power source circuit associated with the first seat when the key switch associated with the second seat is turned on;
a solenoid-operated directional control valve;
hydraulic circuit means connecting said power cylinders, said directional control valves, said first, second, and third solenoid-operated valves and said solenoid-operated directional control valve;
said solenoid-operated directional control valve selectively establishing and interrupting said hydraulic circuit means between the power cylinders associated with the front wheels and the power cylinders associated with the rear wheels; and
a solenoid-operated selector in said hydraulic circuit means between the direction control valve associated with one of said first or second seats and said second or third solenoid-operated valves, said solenoid-operated selector having a first position and a second position operable to reverse the flow of hydraulic fluid through said second and third solenoid-operated valves such that the wheel steering directions of said directional control valve associated with said one seat are reversed, whereby an operator can selectively change the wheel steering directions when changing the position of said one seat between front facing and rear facing positions.

* * * * *